(12) United States Patent
Collar et al.

(10) Patent No.: US 8,237,776 B2
(45) Date of Patent: Aug. 7, 2012

(54) METHOD AND APPARATUS FOR GENERATING STEREOSCOPIC IMAGES FROM A DVD DISC

(75) Inventors: Bradley Thomas Collar, Valencia, CA (US); Christopher J. Cookson, Studio City, CA (US); Lurinda Chin, Northridge, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1309 days.

(21) Appl. No.: 11/935,445

(22) Filed: Nov. 6, 2007

(65) Prior Publication Data

US 2009/0102914 A1    Apr. 23, 2009

(51) Int. Cl.
*H04N 15/00* (2006.01)
*H04N 13/00* (2006.01)
(52) U.S. Cl. ............................................. 348/46; 348/42
(58) Field of Classification Search ......................... None
See application file for complete search history.

(56) References Cited

U.S. PATENT DOCUMENTS

| | | | |
|---|---|---|---|
| 3,436,473 A | 4/1969 | Mcmann, Jr. | |
| 6,529,604 B1 | 3/2003 | Park et al. | |
| 6,546,053 B1 | 4/2003 | Ishii | |
| 7,317,868 B2 * | 1/2008 | Oshima et al. | 386/329 |
| 2002/0009137 A1 | 1/2002 | Nelson et al. | |
| 2004/0240860 A1 | 12/2004 | Bruls et al. | |
| 2005/0105450 A1 * | 5/2005 | Cookson et al. | 369/112.23 |
| 2005/0111334 A1 * | 5/2005 | Cookson et al. | 369/94 |
| 2005/0185937 A1 | 8/2005 | Comer et al. | |
| 2005/0259147 A1 | 11/2005 | Nam et al. | |
| 2006/0062294 A1 | 3/2006 | Lin et al. | |
| 2006/0177199 A1 | 8/2006 | Horiguchi et al. | |
| 2011/0164112 A1 * | 7/2011 | Husak et al. | 348/43 |

* cited by examiner

*Primary Examiner* — John B. Walsh
(74) *Attorney, Agent, or Firm* — Gottlieb, Rackman & Reisman, P.C.

(57) ABSTRACT

A system and method described herein provide stereoscopic video using standard DVD video data combined with enhancement data. In various embodiments, the enhancement data may be stored on the same DVD as the standard video, or provided via downloading and/or streaming to a stereoscopic DVD player. When stored on the DVD, the enhancement data is provided in various forms, including MPEG (-1 or -2) program Stream level; or the MPEG elementary stream level. In one embodiment, the enhancement data consists of a difference signal between left- and right-eye images taken on a pixel-by-pixel basis.

10 Claims, 7 Drawing Sheets

| D'xy | 2 (D'xy-128) | D'xy | 2 (D'xy-128) | D'xy | 2 (D'xy-128) | D'xy | 2 (D'xy-128) |
|---|---|---|---|---|---|---|---|
| 0 | -255 | 65 | -126 | 129 | 2 | 193 | 130 |
| 1 | -254 | 66 | -124 | 130 | 4 | 194 | 132 |
| 2 | -252 | 67 | -122 | 131 | 6 | 195 | 134 |
| 3 | -250 | 68 | -120 | 132 | 8 | 196 | 136 |
| 4 | -248 | 69 | -118 | 133 | 10 | 197 | 138 |
| 5 | -246 | 70 | -116 | 134 | 12 | 198 | 140 |
| 6 | -244 | 71 | -114 | 135 | 14 | 199 | 142 |
| 7 | -242 | 72 | -112 | 136 | 16 | 200 | 144 |
| 8 | -240 | 73 | -110 | 137 | 18 | 201 | 146 |
| 9 | -238 | 74 | -108 | 138 | 20 | 202 | 148 |
| 10 | -236 | 75 | -106 | 139 | 22 | 203 | 150 |
| 11 | -234 | 76 | -104 | 140 | 24 | 204 | 152 |
| 12 | -232 | 77 | -102 | 141 | 26 | 205 | 154 |
| 13 | -230 | 78 | -100 | 142 | 28 | 206 | 156 |
| 14 | -228 | 79 | -98 | 143 | 30 | 207 | 158 |
| 15 | -226 | 80 | -96 | 144 | 32 | 208 | 160 |
| 16 | -224 | 81 | -94 | 145 | 34 | 209 | 162 |
| 17 | -222 | 82 | -92 | 146 | 36 | 210 | 164 |
| 18 | -220 | 83 | -90 | 147 | 38 | 211 | 166 |
| 19 | -218 | 84 | -88 | 148 | 40 | 212 | 168 |
| 20 | -216 | 85 | -86 | 149 | 42 | 213 | 170 |
| 21 | -214 | 86 | -84 | 150 | 44 | 214 | 172 |
| 22 | -212 | 87 | -82 | 151 | 46 | 215 | 174 |
| 23 | -210 | 88 | -80 | 152 | 48 | 216 | 176 |
| 24 | -208 | 89 | -78 | 153 | 50 | 217 | 178 |
| 25 | -206 | 90 | -76 | 154 | 52 | 218 | 180 |
| 26 | -204 | 91 | -74 | 155 | 54 | 219 | 182 |
| 27 | -202 | 92 | -72 | 156 | 56 | 220 | 184 |
| 28 | -200 | 93 | -70 | 157 | 58 | 221 | 186 |
| 29 | -198 | 94 | -68 | 158 | 60 | 222 | 188 |
| 30 | -196 | 95 | -66 | 159 | 62 | 223 | 190 |
| 31 | -194 | 96 | -64 | 160 | 64 | 224 | 192 |
| 32 | -192 | 97 | -62 | 161 | 66 | 225 | 194 |
| 33 | -190 | 98 | -60 | 162 | 68 | 226 | 196 |
| 34 | -188 | 99 | -58 | 163 | 70 | 227 | 198 |
| 35 | -186 | 100 | -56 | 164 | 72 | 228 | 200 |
| 36 | -184 | 101 | -54 | 165 | 74 | 229 | 202 |
| 37 | -182 | 102 | -52 | 166 | 76 | 230 | 204 |
| 38 | -180 | 103 | -50 | 167 | 78 | 231 | 206 |
| 39 | -178 | 104 | -48 | 168 | 80 | 232 | 208 |
| 40 | -176 | 105 | -46 | 169 | 82 | 233 | 210 |

FIG. 6A

| 6A |
|---|
| 6B |

FIG. 6

| D'xy | 2 (D'xy-128) | D'xy | 2 (D'xy-128) | D'xy | 2 (D'xy-128) | D'xy | 2 (D'xy-128) |
|---|---|---|---|---|---|---|---|
| 41 | -174 | 106 | -44 | 170 | 84 | 234 | 212 |
| 42 | -172 | 107 | -42 | 171 | 86 | 235 | 214 |
| 43 | -170 | 108 | -40 | 172 | 88 | 236 | 216 |
| 44 | -168 | 109 | -38 | 173 | 90 | 237 | 218 |
| 45 | -166 | 110 | -36 | 174 | 92 | 238 | 220 |
| 46 | -170 | 111 | -34 | 175 | 94 | 239 | 222 |
| 47 | -168 | 112 | -32 | 176 | 96 | 240 | 224 |
| 48 | -160 | 113 | -30 | 177 | 98 | 241 | 226 |
| 49 | -158 | 114 | -28 | 178 | 100 | 242 | 228 |
| 50 | -156 | 115 | -26 | 179 | 102 | 243 | 230 |
| 51 | -154 | 116 | -24 | 180 | 104 | 244 | 232 |
| 52 | -152 | 117 | -22 | 181 | 106 | 245 | 234 |
| 53 | -150 | 118 | -20 | 182 | 108 | 246 | 236 |
| 54 | -148 | 119 | -18 | 183 | 110 | 247 | 238 |
| 55 | -146 | 120 | -16 | 184 | 112 | 248 | 240 |
| 56 | -144 | 121 | -14 | 185 | 114 | 249 | 242 |
| 57 | -142 | 122 | -12 | 186 | 116 | 250 | 244 |
| 58 | -140 | 123 | -10 | 187 | 118 | 251 | 246 |
| 59 | -138 | 124 | -8 | 188 | 120 | 252 | 248 |
| 60 | -130 | 125 | -6 | 189 | 122 | 253 | 250 |
| 61 | -134 | 126 | -4 | 190 | 124 | 254 | 251 |

FIG. 6B

METHOD AND APPARATUS FOR GENERATING STEREOSCOPIC IMAGES FROM A DVD DISC

RELATED APPLICATIONS

The subject matter of this application is related to application Ser. No. 11/748,695 filed May 15, 2007, incorporated herein by reference.

BACKGROUND OF THE INVENTION

A. Field of Invention

A stereoscopic or 3D program is generated by a player and displayed using standard video content from a DVD combined with additional information. The player receives the additional information from a remote server through a network interface, or from a different portion of the DVD.

B. Description of the Prior Art

Displays currently available commercially can present only two-dimensional (2-D) flat images and almost all content being distributed today to the general public, using for example, optical discs (e.g., standard DVDs, as well as Blu-ray DVDs and HD-DVDs) are configured for presentation on these 2-D displays. Technology has been developed for presenting 3-D or stereographic images, and it is believed that there will be an increasing demand for content in this format. However, since most displays presently available are 2-D displays, at least for the foreseeable future, content will have to be distributed in both formats.

One solution to this problem is to create two different DVDs for each video program (e.g., one DVD that is configured for standard players and 2-D displays and a different DVD configured for stereoscopic systems). In most instances, the 2-D content can be provided on a single layer of a disc. However, the stereoscopic version of the same content may require the full capacity of both physical layers of one side of a DVD, thereby increasing the cost of manufacturing the disc.

Another solution would be to provide both formats on the same disc, one format on each side. However, this solution may still not be ideal because this process is even more expensive per disc then the previous solution.

Furthermore, until a large number of stereoscopic DVD players are sold in the marketplace, the cost of creating a small number of stereoscopic DVDs or players may be too high.

Therefore, a system is needed that allows both a standard version of a video program and a stereoscopic version of the same program to be efficiently distributed while continuing to use a single DVD. It would further be desirable to avoid rendering obsolete the large number of existing standard DVDs and players in the possession of consumers. In addition, it would be desirable to provide a means of distributing stereoscopic video that is relatively resistant to piracy.

U.S. Pat. No. 6,633,725 describes a method and apparatus wherein content is provided on two layers of a DVD. On one layer, the content is provided in a standard format and definition. The second layer is used for additional information over and above what is needed for a standard presentation of the content for enhancing the experience of watching the content in standard definition. For example, the information may include a second camera angle and scenes from this second camera angle can be used to replace scenes from a first camera angle. Alternatively, the information on the second layer may be high definition information that is combined by a player with the content in the standard definition format to render it into content in a high definition format.

In U.S. Patent Publication 2004/0240860 an apparatus for reproducing video data signals is described with input means for receiving encoded video data signals and processing means for decoding the encoded video data signals. The encoded video data signals includes a base stream of signals representing a standard resolution portion of the video data signals and at least one enhancement stream of signals representing a high-resolution portion of the video data signals. The apparatus is capable of reproducing high-resolution video data by decoding and combining those streams.

However, the preceding documents do not address the issue of storing stereoscopic video on a DVD. Furthermore, they do not address the issue of providing stereoscopic video without the need for consumers to replace their existing standard DVDs or players. In addition, they do not address possible piracy issues.

SUMMARY OF THE INVENTION

The system and method described herein provides a stereoscopic video signal using standard DVD video data combined with enhancement data. In one embodiment, the enhancement data is provided via downloading and/or streaming to a stereoscopic DVD player.

In a second embodiment, the enhancement data may be burned on the same DVD as the standard video. In other embodiments, the enhancement data is provided as a single file and as a data stream. Both types of data are combined with the standard video data to obtain the stereoscopic video signal.

In one embodiment of the invention, a method of preprocessing a 3D source video is presented in a way that allows the enhancement data (e.g. alternate eye view) as a difference signal consisting of the (Right Eye View-Left Eye View) on a pixel-by-pixel basis. This difference signal is preprocessed by increasing the intensity values of each pixel, thereby decreasing the data rate necessary to encode. The preprocessed difference signal is encoded and multiplexed onto the disc along with the standard video program. The standard video program and enhancement data (consisting of the preprocessed difference signal) are decoded by two separate decoders. The player uses the decoders to receive the decoded enhancement data and perform the inverse of the difference signal preprocessing step. For example, the player can use a lookup table to perform the inverse of the difference signal preprocessing step.

The enhancement data is scaled down from high definition resolution to a standard definition resolution prior to encoding. The player scales the decoded enhancement data up to high definition resolution prior to performing inverse of the difference signal preprocessing step.

In another embodiment, a method of preprocessing the enhancement data (alternate eye view) is presented in which the enhancement data is noise reduced prior to encoding. The noise reduction consists of removing the film grain from the enhancement data. The film grain is stored as metadata in the encoded enhancement data. The player re-inserts the film graininess during decoding of the enhancement data.

In another embodiment, a method of upgrading the firmware of a normal high definition disc player (HD DVD and/or Blu-ray) to make it a 3D capable player is presented. The method uses a normal player with two video decoders. The player is firmware operated, and the firmware is upgraded to adds logic to the player's navigation manager to act upon the presence of a 3D flag. More specifically, when the 3D flag is present, the player looks for enhancement data on the disk and then combines the same with the standard information on the disc to provide a 3D rendering. For this purpose, the player includes a video renderer module to perform the processing required to generate a 3D output. The video renderer includes logic to scale the standard definition and perform the inverse of the difference signal preprocessing step. A firmware upgrade is used to add logic to the player's video rendering module to scale the standard definition resolution video up to high definition resolution prior to performing the inverse of the difference signal preprocessing step.

In this manner, a single optical disc is produced that includes both a 2D and 3D version of the disc. The disc can play as 2D in all conventional high definition players (HD DVD or Blu-ray) without the need for a firmware update.

As discussed, preferably, the disc includes a 3D flag indicating it contains enhancement data for 3D playback.

BRIEF DESCRIPTION OF THE DRAWINGS

FIG. 6 shows a look-up table to be used by a high definition DVD player, such as the one shown in FIG. 5, reversing the preprocessing step and subsequent derivation of the alternate eye view.

DETAILED DESCRIPTION OF THE INVENTION

Figure 1:
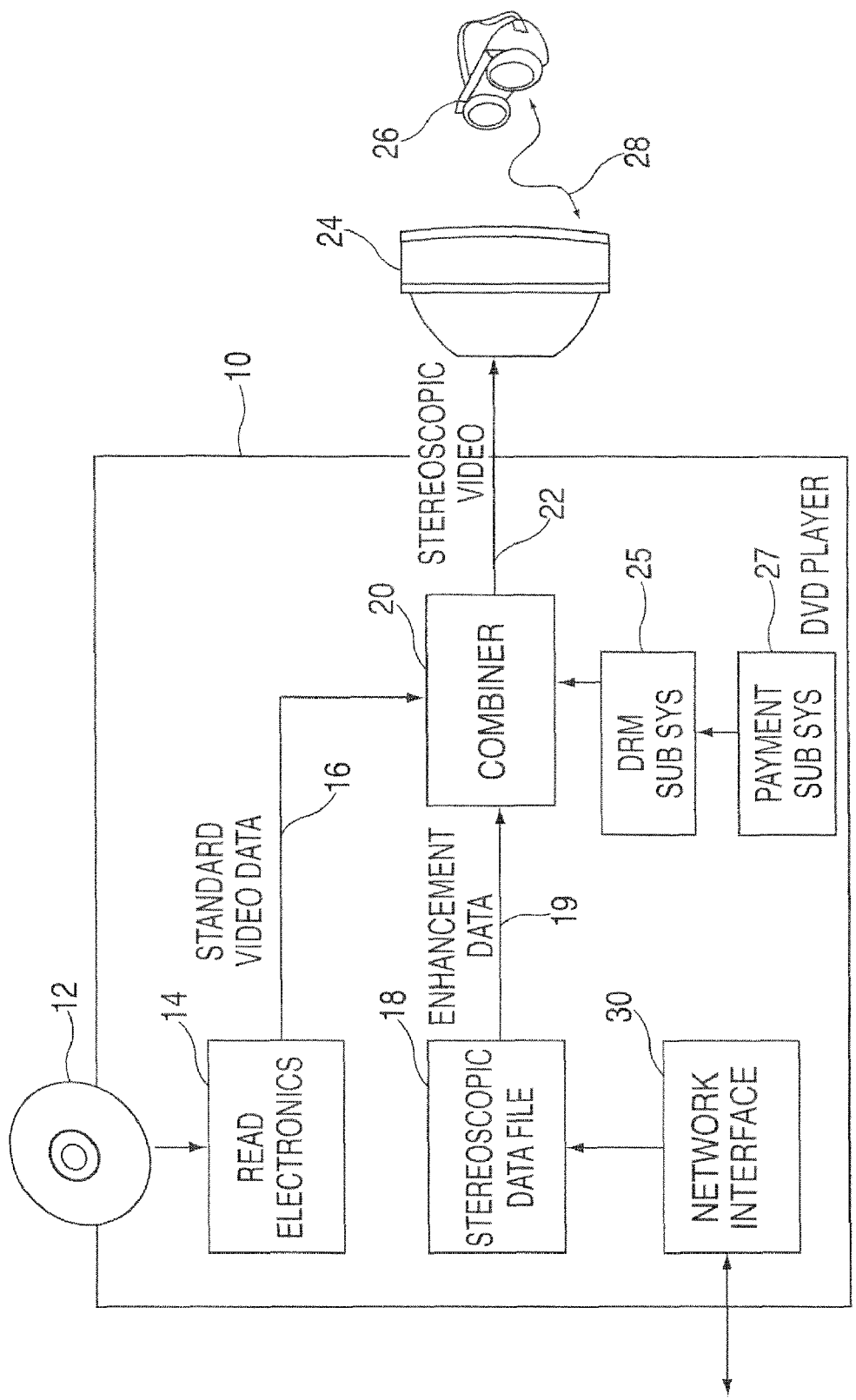
FIG. 1 is a block diagram of a DVD player for combining video data from a standard DVD and enhancement data from a file to generate a stereoscopic video signal.

The present invention takes advantage of the concept that a stereoscopic video signal can be generated by combining a standard video signal (SD) with additional information in the form of enhanced data (ENH) required for the stereoscopic video signal (SSVS). One possible technique for implementing this approach is to interleave the data at the level of video object units (VOBUs) as known from the DVD standard. Multi (camera) angle pointers or multi-path pointers may be used for this purpose. For example the SD data may be comprised of a default camera angle track and additional or ENH data for an alternate camera angle track.

Every DVD player has a so-called track-buffer of X Mbits. The encoding and multiplexing of the SSVS stream must be done in such a way that at every separation point (i.e., a point in time separating SD sectors and SSVS sectors) there are enough bits in the track-buffer to bridge the gap in time it takes to jump over a block of enhancement sectors. Suppose it takes $T_0$ seconds for a jump before new SD sectors are read again and data is supplied to the decoder at an average bit rate of $BR_{av}$. This means that at least $T_0 * BR_{av}$ bits must be present in the buffer as the jump starts.

The peak rate at which a DVD player can read data can be designated as $BR_{pk}$. Reading of data should be performed at a rate as close as possible to $BR_{pk}$. During the decoder must be supplied with the needed SD bits. Therefore the content of the track-buffer increases at a rate $BR_{pk} - BR_{av}$. Generally, the number of bits collected in the buffer while the SD sectors are read is, $T_1 * (BR_{pk} - BR_{av1})$ and this number must be equal to or exceed the number of bits, needed during the jump phase (, $T_0 * BR_{av}$). This puts an additional constraint on the SD encoder.

The DVD disc will also contain a 3D flag (3DF) located in the navigation data of the disc which indicates that the disc contains two camera angles, each containing one eye-view of the SSVS. When this flag is set, normal DVD players will not recognize the flag and only decode the first camera angle. In addition, the disc can be authored to mask the angle-change user operation control, thus preventing the user from accessing the second angle manually via the remote control. A 3D-enabled DVD player must recognize the flag and subsequently combine the two video angles into the SSVS signal.

In another embodiment the control circuit of a 3-D DVD player reads a block of SD data (e.g., for 1 second of video) data very fast and stores it in a memory, then jump to the enhancement data area and reads a block of ENH data very quickly (again, for 1 second of video) stores the data in memory. In this way the control unit of the player keeps reading the SD and ENH sectors in an alternating sequence. The base decoder and the enhancement decoder read the respective data from this memory. The control unit has or is associated with input buffers and the memory are made sufficiently fast and large so that SD and ENH decoders never run out of data and thus are able to deliver an uninterrupted continuous video data signal. In this embodiment, for the interval of 1 second about 2 MB of memory is required. Furthermore, the control unit can be adapted to recognize signaling bits which do not affect regular DVD players, but can be used to direct the apparatus to reproduce the combined stereoscopic video data.

Yet another embodiment stores the base data representing a standard resolution portion of the video data signals and enhancement data representing the alternate eye-view portion of the video data signals on different physical layers on the DVD. In this case the control unit is adapted to receive encoded video data signal from this multi-layer optical disc. In addition to the above, there are other ways to separate SD and ENH data in a backward compatible way at the MPEG stream level, such as the MPEG-2 Program Stream level; or the MPEG-2 (or MPEG-1) elementary stream level.

At the MPEG-2 Program Stream level, the enhancement data is preferably provided as a private data stream, or is multiplexed with other data to form a private data stream. Alternatively, the enhancement data can be included directly into the MPEG-2 video elementary stream containing various other segments such as extension_and_user_data segments, a sequence, a group of pictures or at the picture level. A drawback of including the enhancement data directly into the MPEG stream is that the DVD standard requirement restricts the maximum data rate to 10.08 Mbps. Although the target average for the total data stream is about 8 Mbps (allowing for recording 135 minutes on a dual-layer DVD disc), peak rates can be well above the target average. Legacy players may be unable to function normally if this maximum bit rate is exceeded. Therefore, the allocation rule for the ENH data must be adjusted in such a way that the excess data near the peak rates are more evenly spread over a wider area in the stream. This can be accomplished by defining the size of the separate buffer, which is required for the ENH data stream in the MPEG-2 system target decoder model, to be big enough to handle the vast majority of streams. In exceptional cases peak bit rate problems can be solved by proper preprocessing (filtering) and/or by adjusting the compression rate locally. After readout by the control unit the prefetched ENH data is kept in an ENH data memory until it is needed by the enhancement decoder. Even when the average prefetch time offset is by as much as 1 minute, the corresponding memory size is still not excessive (in the order of 60 seconds*2 Mbps<16 MB). In a particular embodiment a faster than 1× drive and optional SD data memory may be used.

Separating the SD and the enhancement data streams at the MPEG level has a number of advantages. For example, authoring is relatively simple as the two streams are combined immediately after coding. Other stages of the authoring process are hardly affected. Another advantage is that the jump noise in the apparatus is kept low (compared with other embodiments in which the streams are at a greater physical distance). Moreover, the MPEG stream including the ENH data can be redistributed without additional processing, using existing standards.

In a first embodiment, a system and method is provided in which a stereoscopic program is displayed using content obtained from a standard DVD and a separate file containing enhancement data. The system further includes a player with means for decoding the enhancement data and the video data from the DVD, and combining them to generate stereoscopic video data. More specifically, as illustrated in FIG. 1, a system 10 receives a first DVD 12 that contains standard content. Data from DVD 12 is obtained by a read electronics member 14 which includes a read head (not shown). Member 14 decodes the data from the DVD and generates a standard video data SD signal 16.

The system 10 also receives a stereoscopic data file 18 that includes enhancement or ENH data 19 necessary to convert the standard video data 16 into a stereoscopic video signal SSVS. This stereoscopic video signal may comprise alternate video lines or fields intended for the viewer's left and right eyes, respectively, e.g., one displayed line may contain left eye video and the next line may contain right eye video, or may use some other scheme of providing stereoscopic video images. The enhancement data 19 is combined by a combiner 20 with the standard video data to generate the stereoscopic video signal 22. This signal 22 is fed to a display device 24 for presentation to one or more viewers. The viewers may need some special equipment, such as stereoscopic eyewear 26 to see the presentation properly. The eyewear 26 may be coupled by a controller (not shown) and a control link 28 that may control shutters in the eyewear (not shown) such that when the left eye video is displayed a left eye shutter in the eyewear is open and a right eye shutter is closed, and vice versa when the right eye video is displayed. The shutter control link may comprise an infrared radiation (IR) link or a radio-frequency link, or any other suitable communication medium, although, preferably, a wireless medium.

In the embodiment shown in FIG. 1, the stereoscopic data file 18 is downloaded via a network interface 30 from a remote network (not shown). The file 18 may be stored in any type of internal memory such as a magneto-optical hard drive, a RAM, or an external or removable memory such as a thumb drive.

Alternatively, the contents of this file may be downloaded from a second DVD with the enhancement data. The second DVD may be a read-only type, or, alternatively, a read-write (RW) type. If the second DVD is a RW type, the enhancement data may be downloaded via the network interface and written to the RW DVD. In this variation of the invention, the network interface 30 and stereoscopic file 18 are replaced by a second DVD and a corresponding read electronics member (not shown). The enhancement data from the second DVD is combined by combiner 20 with the standard video signal as described above.

A Digital Rights Management (DRM) subsystem 25 may be incorporated into the player 10 to insure that the player 10 is authorized to decode the SD video signal. The DRM system may also limit the number of times that the file may be decoded for each payment. A payment/authorization subsystem 27 may also be included in the player to allow additional plays of the content in exchange for additional payments to the content provider.

Figure 2:
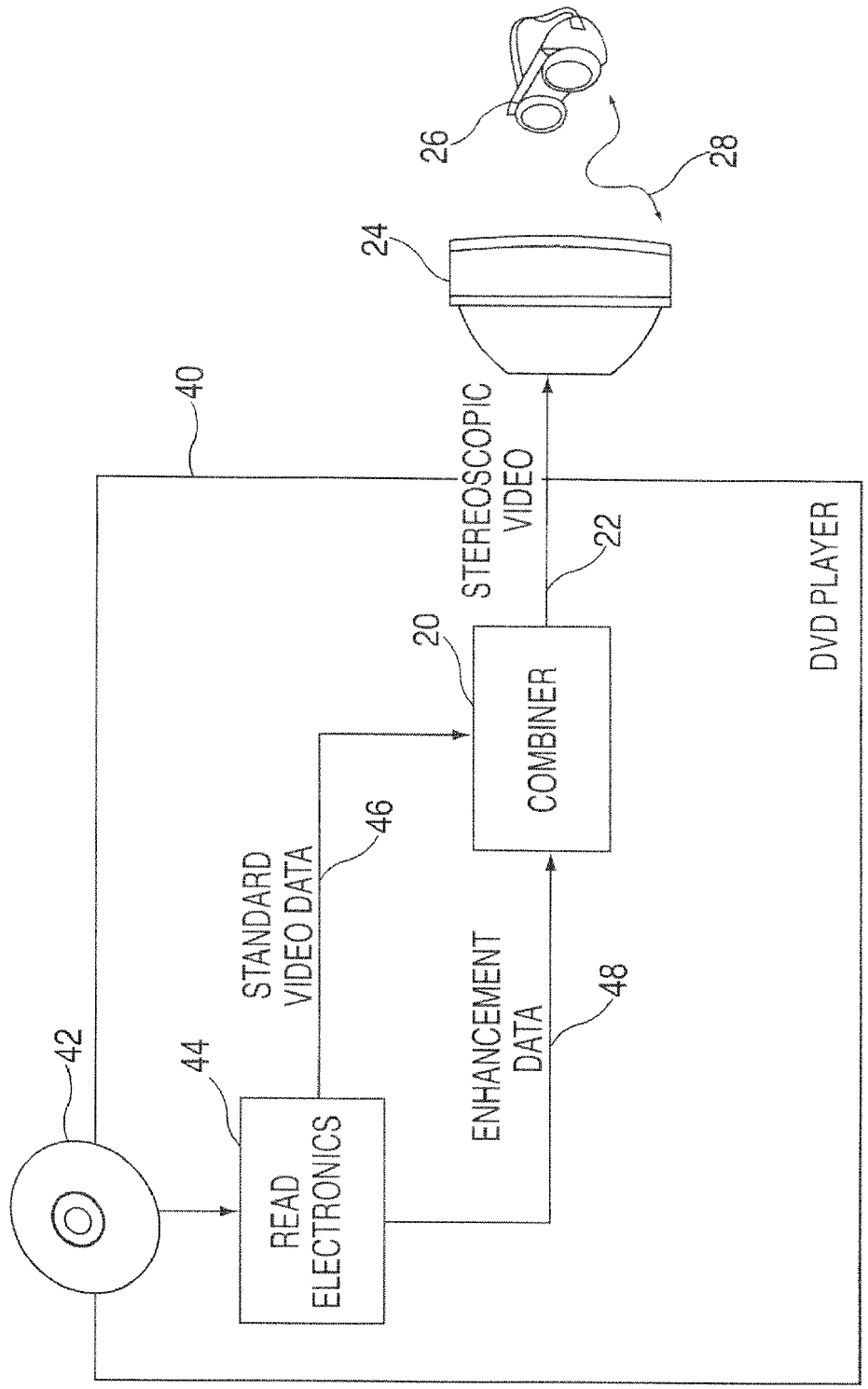
FIG. 2 is a block diagram of a DVD player for combining standard video data and enhancement data to generate a stereoscopic video signal.

In a second embodiment, shown in FIG. 2, a single DVD 42 includes both a standard video program data and enhancement data. The player 40 includes a read electronics member 44 that reads from the DVD 42 both the standard video data 46 and the enhancement data 48 to generate stereoscopic video data. The two are combined in combiner 20 which then generates a stereoscopic or 3D image as discussed above. It should be understood that in FIG. 2 for the purpose of logical clarity, the two data streams 46, 48 are shown separately, but in many physical implementations a single data stream 22 containing both standard video data and enhancement data is recovered by the read electronics member 44, and the standard data and enhancement data portions are first extracted or de-multiplexed from the single stream by the read electronics member 44 before being separately decoded and combined to form the stereoscopic video, as necessary.

Figure 3:
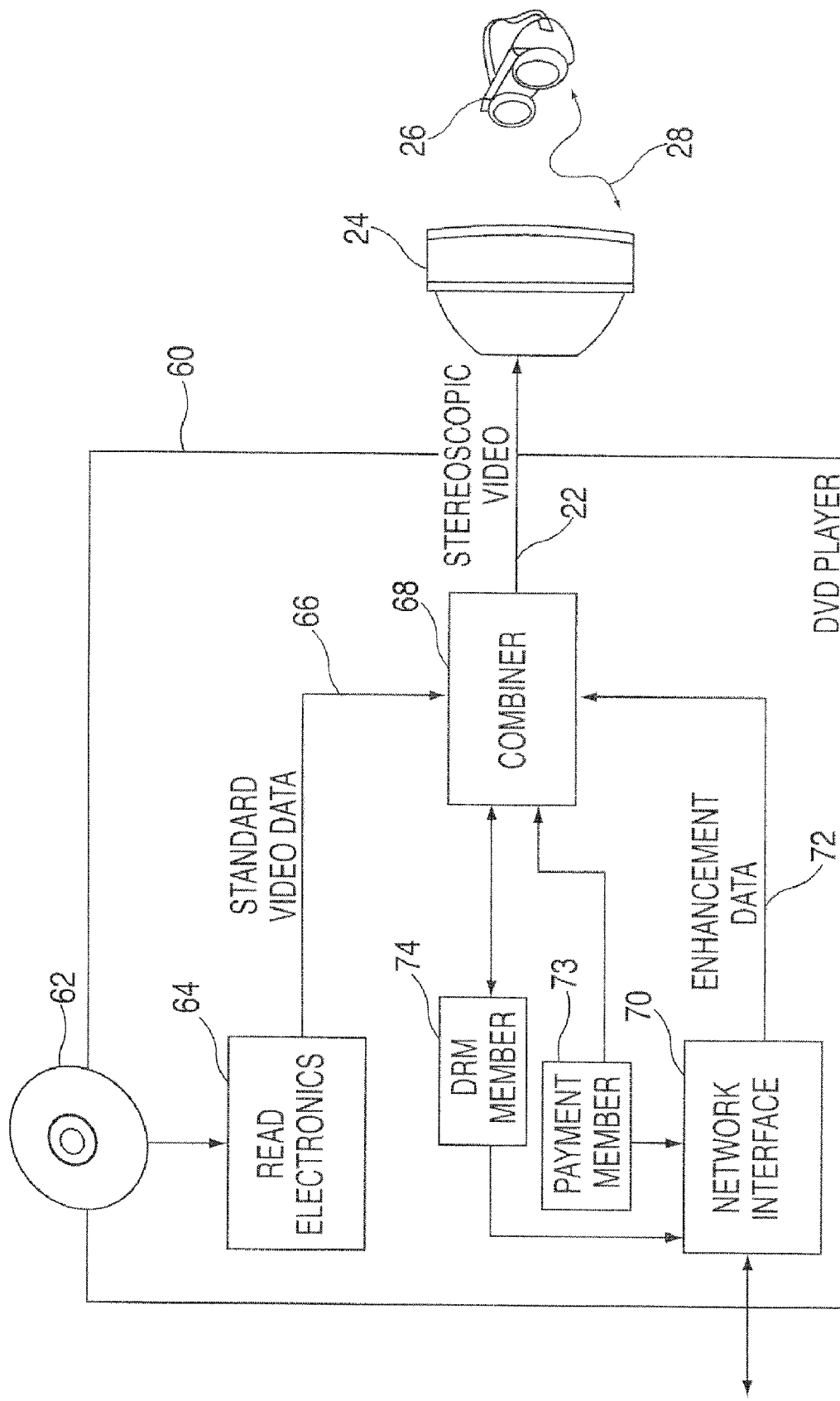
FIG. 3 is a block diagram of a DVD player for combining video data from a standard DVD and enhancement data from a stream to generate a stereoscopic video signal.

In a third embodiment, a system and method are provided in which the enhancement data is received in a stream rather then as a single data file stored in a memory. As shown in FIG. 3, in this system 60, a DVD 62 is read by a read electronics member 64. Member 64 then generates the standard video data stream 66 to combiner 68. Enhancement data with the information required for stereoscopic presentation is received from a remote server (either via an Inter- or Intra-net, not shown) through a network interface 70. The stream of enhancement data 72 is required to generate the stereoscopic video signal 22 and is supplied to the combiner 68.

The source of the enhancement data stream may be a data server operated by the provider of the DVD content, or any other party authorized by the content provider. A payment beyond the original cost of the DVD may be required to authorize the player to decode the stream using e.g. a payment subsystem 73.

A Digital Rights Management (DRM) member 74 may also be included with the player. The member 74 controls the generation of stream of enhancement data 72 to insure that the stream may be decoded only by authorized players. The DRM member 74 may also limit the number of times that the stream may be decoded for each payment. Alternatively, either or both the DRM member and the subsystem 73 may control the operation of combiner 68 and may disable said combiner 68 under certain conditions, including DRM failure or failure to pay for additional copies of the stereoscopic content. The network interface 70 has sufficient bandwidth to support the relatively high data rate needed to supply the enhancement data 72 to the combiner 68 such that real time generation of stereoscopic video signal 22 may be sustained.

Figure 4:
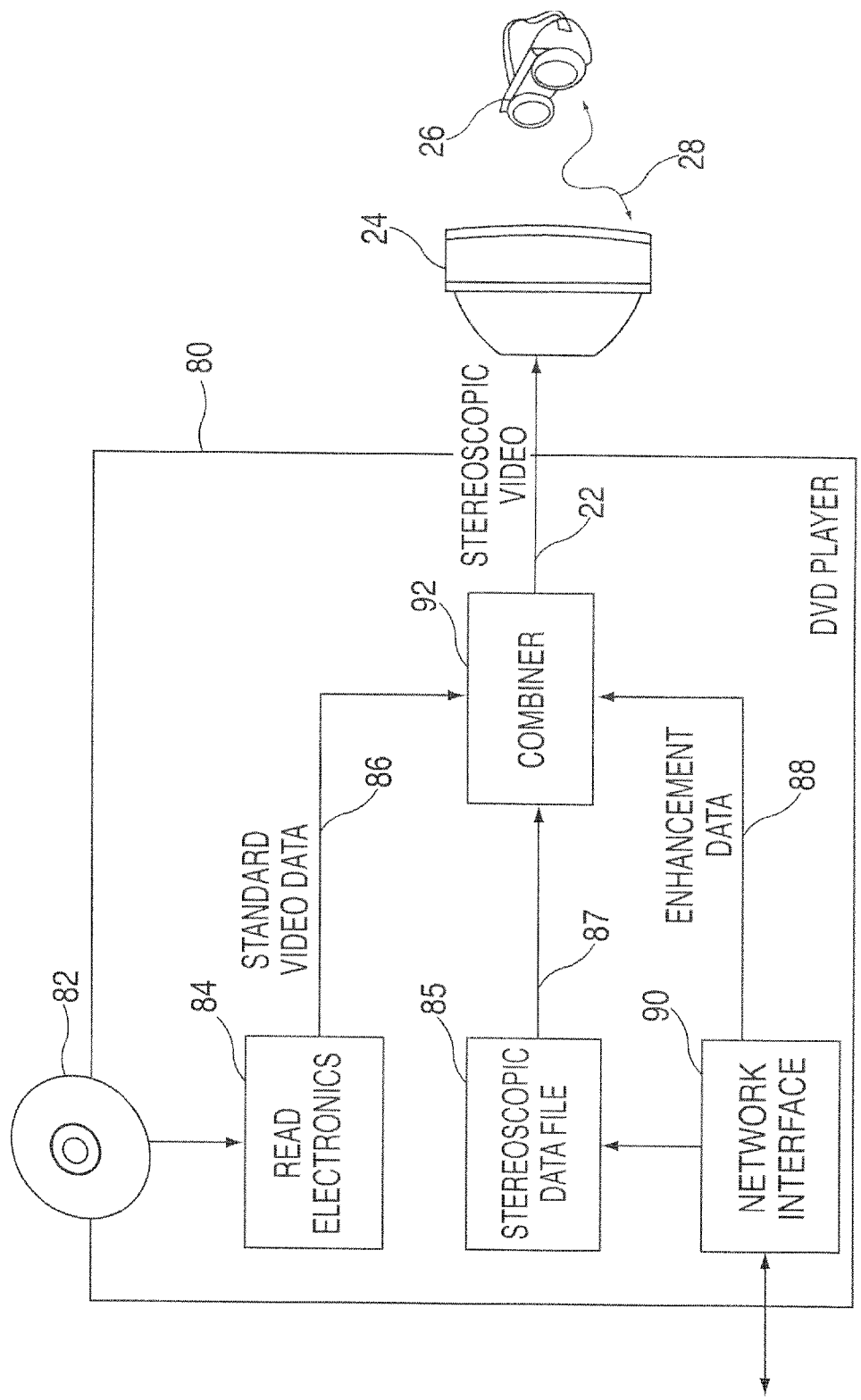
FIG. 4 is a block diagram of a DVD player for combining video data from a standard DVD and enhancement data from both a file and a stream to generate a stereoscopic video signal.

In a fourth embodiment, a player receives the enhancement data in both a file and a stream. FIG. 4 illustrates a player 80 receiving a first DVD 82 that contains only standard video data. The read electronics member 84 generates from the DVD 82 the standard video data stream 86. The enhancement data required to generate stereoscopic video is supplied by both a file 87 and separate stream 88 from a remote network via a network interface 90. The file 87 is stored in an appropriate memory and is provided together with the enhancement data stream 88 in combiner 92. The enhancement data 87, 88 is decoded and combined with the decoded standard video data 86 by the combiner 92 to form the stereoscopic video 22.

Any alternatives discussed in relation to the previous embodiments are equally applicable to this fourth embodiment. For example, the source of the file may alternatively be a second DVD and the source of the stream may be a third party (neither the consumer nor the content owner).

Added security against piracy may be provided in this embodiment by, for example, only authorizing the stream for the duration of a single playing of the content, so that no permanent copy of at least part of the enhancement data is ever available at the player. At the same time, part of the additional content can be provided by the file, easing bit rate requirements on the network interface.

Figure 5:
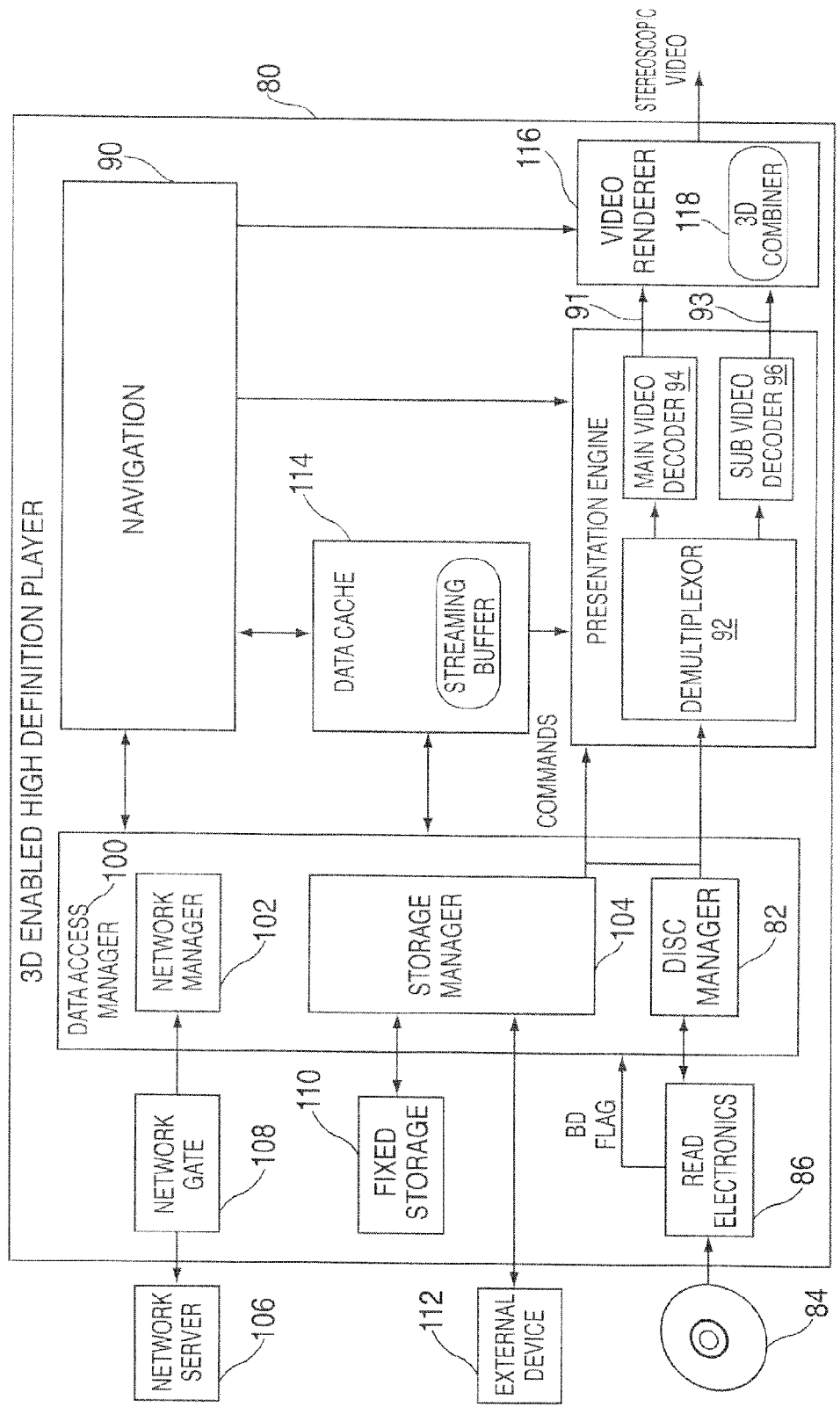
FIG. 5 shows a block diagram of a high definition DVD player for combining data from a DVD with enhanced data from the disc, an external data storage device or a network server to generate stereoscopic video signals.

In a fifth embodiment, shown in FIG. 5, a single high definition disc (HD DVD or Blu-ray) includes a standard video program data, enhancement data representing the alternate eye view, and a 3D flag set to indicate its 3D capabilities. The player 80 includes a Disc Manager 82 that directs a read electronics member 86 that reads from the disc 84 a single data stream containing both the standard video data and the enhancement data to generate stereoscopic video data.

The player further includes a data manager 100 with a network manager 102, a data storage manager 104, and a disc manager 82. The data access manager also exchanges information and data with an external network server 106 through a network gate 108. Various control data including applications associated with various functions of the player are stored in a main or fixed data storage element 110. Additional information and/or control commands can be received from a removal or external data storage device 112.

The data stream from the disc 84 is passed to the Presentation Engine 88 of the player 80 and as directed by the Navigation manager 90. As described in the parent application described above, normally, the presentation engine processes the data from the disc 84 under the control of commands from the data access manager and the navigation manager 90. As part of this processing, the data stream is demultiplexed and the video data is fed to the Main Video decoder 94 and presented to the video renderer 116 as a stream of standard video data 91. Other information, including a private video stream, and the like is decoded by a Sub-Video decoder 96 and presented to the video renderer 116. Data cache 114 is used to store data temporarily as needed.

Importantly, the read electronics member 86 detects the 3D flag (when present) from the disc and sends it to the data access manager and subsequently to the navigation manager to indicate that the disc 84 contains enhancement data. In response the navigation manager modifies the operation of player 80 so that the player can generated SSVS signals. More particularly, the presentation engine 88 demultiplexes the stream from disc manager 82 into two separate video streams: which are then fed to the decoders 94 and 96 respectively. The decoded signals are the main video stream 91 containing the standard video program (e.g. the left eye view of the program) and a sub-video stream 93 containing the additional video data (e.g. the right eye view) and are passed to the Video Renderer module 116. The Video Renderer module contains a 3D Combiner module 118 which combines the two video streams and generates a corresponding SSVS signal as an output.

It is important to note that the only difference between a normal high definition player (HD DVD or Blu-ray) and the 3D enabled high definition player 90 shown in FIG. 5 is the addition of the 3D Combiner module 118. When a normal high definition player receives a 3D enabled disc 84 that has the 3D flag set, its Navigation Manager ignores the 3D flag altogether and therefore only the main video will be rendered to the screen by the Video Renderer. Therefore the content from the disc 84 is presented as a standard video signal. The player can be changed to operate as described for generating SSVS signals by upgrading the firmware of the player thereby affecting the operation of the data access manager, the presentation engine and the video rendering module as discussed above. Similarly a DVD player implemented in a PC may be upgraded by providing a new video card.

Alternatively, as shown in FIG. 5, enhancement data representing the alternate eye view can be streamed from a Network Server 106 to the player's streaming buffer (data cache 114) and subsequently to the Sub-Video decoder 96.

Alternatively the enhancement data can be downloaded from Network Server 106 and stored into the player's Fixed Storage 110 and subsequently played back in conjunction with the standard video content located on the disc.

Alternatively the enhancement data can be played back from external device (e.g USB hard drive) 112 as discussed above with respect to enhancement data from the network server 106.

Alternatively the enhancement data can consist of a difference signal D. The difference signal consists of the difference between the standard video signal (e.g. the left eye view) and the alternate eye view (e.g. the right eye view) for each component of each pixel of the video image, that is for each component of each pixel $D_{xy}=L_{xy}-R_{xy}$ where x and y represent the x and y coordinates of a specific pixel in the video frame.

During the video preparation process the difference signal can be further preprocessed such that it can be encoded at a very low data rate to make it more practical to fit the entire 3D movie on a disc. One method of preprocessing the difference signal is to increase the intensity values of each component of each pixel of the video image by adding an offset value to the original value. Since HD DVD and Blu-ray video signals have 8 bits (256 values) per component, the difference signal should be converted to 7 bits (128 values) per component in order to avoid clipping of the values above 255 and below 0 during the preprocessing step. Therefore, each component of each pixel of the preprocessed difference signal will be represented by $$D'_{xy} = \left(\frac{D_{xy}}{2}\right) + 128,$$

rounding down to the nearest whole integer.

Subsequently the enhancement data (consisting of the preprocessed difference signal) will be decoded by Sub-Video decoder 96 and passed to the Video Renderer 116. In addition, the standard video program is decoded by Main Video decoder 94 and passed to the Video Renderer 116. The Video Renderer 116 then performs the inverse of the preprocessing step previously described to derive the alternate eye view (e.g. right eye view). Specifically, each component of each pixel of the alternate eye view (e.g. right eye view) is represented by $R_{xy}=L_{xy}-2(D'_{xy}-128)$. The resulting sub-video stream 93 containing the additional video data (e.g. the right eye view) is then passed to the 3D Combiner 118 along with the main video stream 91 containing the standard video program (e.g. left eye view of the program) which generates the corresponding SSVS signal as an output.

Since the preprocessed difference signal D' will contain a finite range of values (from 0 to 255) and in order to minimize the mathematical computations of the player, a lookup table as shown in FIG. 6 can be used to quickly perform the calculation of $-2(D'_{xy}-128)$. Therefore the player will only have to perform a single subtraction calculation to derive the right eye view ($R_{xy}$).

In addition, if the source material is high definition resolution the preprocessed difference signal D' can be scaled down to standard definition resolution prior to video encoding to further reduce data rate needs. In such a case the Video Renderer 116 would scale the preprocessed difference signal D' back up to high definition resolution prior to performing the inverse of the preprocessing step (as previously described above).

Alternatively the enhancement data representing the alternative eye view can be noise reduced prior to video encoding to further reduce the data rate needs. In particular, the alternate eye view source material can be filtered to remove the film grain. The removed film grain is represented as metadata and stored within the encoded video signal. When the enhancement data is decoded by Sub-Video decoder 96 the film grain is added back into the decoded sub-video stream 93 and is subsequently passed to the Video Renderer 116.

Numerous modifications and alternations may be made to this invention without departing from its scope as defined in the appended claims.

We claim:

1. An apparatus generating a stereoscopic video signal comprising:
   a read member receiving an optical disc and reading standard video data from said optical disc;
   an input device receiving enhancement data;
   a combiner coupled to said read member and said input device and combining said standard video data and said enhancement data to generate said stereoscopic video signal; and
   a network interface exchanging information with a remote server, wherein said input device is coupled to said network interface to receive said enhancement data.

2. The apparatus of claim 1 wherein said input device receives a data file with said enhancement data.

3. The apparatus of claim 1 wherein said input device receives a data stream, said enhancement data being part of said data stream.

4. A method of generating a stereoscopic video signal by a DVD player from an optical disc wherein said player includes a network interface for providing information exchange between said player and a remote server, said method comprising:
   retrieving from said optical disc standard video data;
   retrieving said enhancement data by said network interface;
   receiving enhancement data by said player; and
   combining the standard video data with said video data to generate said stereoscopic video signal.

5. The method of claim 4 wherein said enhancement data is presented as a data file.

6. The method of claim 4 wherein said enhancement data is streamed data.

7. A player capable of playing discs with either 2D or 3D signals comprising:
   two decoders reading data from a disc and generating from said disc a standard and an enhanced signal, respectively;
   wherein one decoder reads left-eye images and the second detector reads images corresponding to a difference between left- and right-eye images, on a pixel-by-pixel basis.

8. The player of claim 7 further comprising a flag-detector detecting a 3D flag indicative of whether a disc contains only 2D signals, or 3D signals.

9. The player of claim 7 wherein said enhancement signal is preprocessed before storage on the disc and wherein one of said decoders performs an inverse process on said enhancement signal to reverse said preprocessing.

10. The player claim 9 wherein said one decoder includes a lookup table for said inverse process.

* * * * *